United States Patent Office 3,497,504
Patented Feb. 24, 1970

3,497,504
REMOVAL OF PENICILLINS FROM CEPHALOSPORINS
Eugene S. Wagner, Indianapolis, Ind., assignor to Eli Lilly and Company, Indianapolis, Ind., a corporation of Indiana
No Drawing. Filed July 10, 1968, Ser. No. 743,593
Int. Cl. C07d 93/00, 99/24
U.S. Cl. 260—243
9 Claims

ABSTRACT OF THE DISCLOSURE

The penicillin activity in a mixture of a penicillin and a cephalosporin can be destroyed without affecting the cephalosporin activity by treating the mixture with 2-mercaptoamines. The mercaptoamine opens the β-lactam ring of the penicillin but is unreactive toward the cephalosporin.

BACKGROUND OF THE INVENTION

The penicillin and cephalosporin families of antibiotics are closely related chemically with both containing a β-lactam ring fused to a second ring which contains sulphur. In the penicillin family the sulphur-containing ring is a five-membered ring while in the cephalosporin family it is a six-membered ring. The nucleus of the penicillin family is depicted by structure I, below, while that of the cephalosporin family is depicted by structure II. Differences within each family result from different substituents attached to the nucleus.

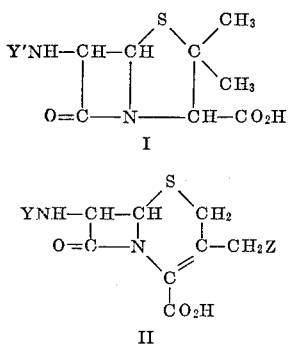

In the production of cephalosporin antibiotics it is possible that contamination with penicillins will occur. This is true whether the cephalosporin is derived from cephalosporin C, which is a fermentation product, or is obtained by the expansion of the penicillin nucleus as described in Morin et al. U.S. Patent 3,275,626. It is to be expected that the amount of contamination will be greater in those cephalosporins obtained by the latter process. It is desirable to remove the penicillin contamination prior to use of the cephalosporin antibiotic.

Because of the similarity of penicillins and cephalosporins chemical methods heretofore employed to remove the penicillin contamination have resulted in the loss of cephalosporin as well. For example, the penicillin may be destroyed by the addition of a small amount of strong acid; however, this also results in the destruction of some of the cephalosporins. It is apparent that such a method is practical only when the amount of penicillin present is quite small in comparison to the amount of cephalosporin. Even then, such a method is undesirable since any loss of cephalosporin is to be avoided, if possible.

SUMMARY

I have now discovered a method for destroying penicillin activity in a mixture of a penicillin antibiotic and a cephalosporin antibiotic without substantially affecting the cephalosporin activity. In accordance with my method the mixture is treated with a 2-mercaptoamine in sufficient quantity to react with substantially all of the penicillin present. All the penicillin reacts, but there is essentially no reaction of cephalosporin. Therefore, a penicillin impurity in virtually any amount can be removed from a cephalosporin without loss of the cephalosporin.

DESCRIPTION OF THE PREFERRED EMBODIMENT

It has been found that 2-mercaptoamines react with the β-lactam ring of penicillins to open the ring and form an amide of penicilloic acid. I have now made the surprising discovery that, despite the similarity in chemical structure, cephalosporins do not undergo this reaction. I have applied this discovery of cephalosporin stability to the problem of penicillin contamination of cephalosporins and have arrived at my method for destroying penicillin contamination without affecting the cephalosporins.

The 2-mercaptoamine to be used in my process is one containing a free sulfhydryl group and a basic amine group on adjacent carbon atoms. Such a mercaptoamine may be represented by the formula:

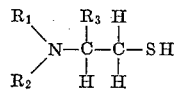

wherein $R^1$ and $R^2$ are selected from the class consisting of hydrogen and lower alkyl; $R^3$ is selected from the class consisting of hydrogen, —$CO_2H$, and —$CO_2R$; and R is lower alkyl. By the term "lower alkyl" is meant a monovalent hydrocarbon radical corresponding to the formula $C_nH_{2n+1}$ where $n$ is an integer of from 1 to about 9. It is to be understood that the carboxyl group may be present as the acid or as a salt thereof such as the sodium, potassium, ammonium, or substituted ammonium salt. Specific examples of mercaptoamines which may be used in my process include 2-aminoethanethiol, 2-dimethylaminoethanethiol, cysteine, the ethyl ester of cysteine, N - butylcysteine, and 2 - (N-hexylamino)-ethanethiol. Cysteine is the preferred mercaptoamine.

The mercaptoamine is added to the mixture of penicillin and cephalosporin antibiotics and is allowed to react with the penicillin. The reaction is a spontaneous one and occurs non-catalytically. Since none of the mercaptoamine is consumed by reaction with the cephalosporin, in theory all the penicillin will eventually be destroyed if an amount of mercaptoamine equivalent to the amount of penicillin present is added. However, complete reaction in such a case would require an impractically long time so that, in practice, an excess of the mercaptoamine is employed. Preferably, from 10 to 100 moles of mercaptoamine per mole of penicillin present are employed. Larger amounts may be used but offer no additional advantages.

The reaction is preferably conducted in an aqueous medium at a pH within the range of 6 to 8 and a temperature within the range of 25° to 30° C. A mixed organic-aqueous solvent system such as ethanol in water or dioxane in water may also be used. A pH as low as 4 or as high as 9 may be employed. Outside this pH range decomposition of the cephalosporin becomes important. The optimum pH is about 7.5. The reaction may be conducted at temperatures of up to about 40° C. before the cephalosporin begins to decompose. At temperatures below about 20° C. the reaction of the mercaptoamine with penicillin proceeds rather slowly.

Under the preferred conditions the 2-mercaptoamine reacts with the penicillin in a relatively short time. The reaction may be complete in as little as 15 minutes or may require as long as two hours. The progress of the reaction can be followed by analyzing for penicillin.

The reaction of the penicillin nucleus with a mercaptoamine results in an opening of the β-lactam ring with the formation of an amide of the type shown in the following formula. For purposes of illustration cysteine is employed as a typical mercaptoamine.

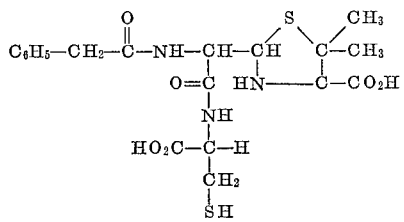

The structure of the product obtained when the amino group is a tertiary one is the corresponding penicilloic acid. Mercapto tertiary amines such as, for example, 2-dimethylamino-ethanethiol do react with the penicillin nucleus but do not react with the cephalosporin nucleus.

Whether or not reaction of the antibiotic with a mercaptoamine occurs depends entirely upon the presence or absence of the penicillin nucleus as shown in Formula I. The nature of the substituent groups attached to the nucleus does not influence reactivity. On the other hand the cephalosporin nucleus as depicted in Formula II is quite stable toward mercaptoamines and the stability is not altered by the nature of substituent groups. For example Y and Y' in Formulas I and II may be such groups as hydrogen, phenylacetyl, phenoxyacetyl, phenylglycyl, 2,6-dimethoxybenzoyl, 5-aminodipamyl, or 2-thienylacetyl and Z may be hydrogen, hydroxy, or acetoxy. It is to be understood that the carboxyl groups may be present as the free acid, as a salt, or as an ester.

My process will be further illustrated by the following examples.

EXAMPLE 1

Three 200 ml. samples of a phosphate buffer having a pH of 7.5 were prepared. To the first sample were added 1 g. of 6-aminopenicillanic acid and 3.6 g. of cysteine; to the second were added 1 g. of 7-aminocephalosporanic acid and 3.6 g. of cysteine; while to the third was added 1 g. of 7-aminocephalosporanic acid with no cysteine. The three samples were stirred at room temperature for four hours and then the reaction mixtures were frozen and lyophilized. Each of the lyophilized residues was analyzed for β-lactam by infrared spectroscopy using mineral oil mulls and examining the characteristic β-lactam absorption band at approximately 1808 cm.$^{-1}$. The 6-aminopenicillanic acid sample showed no absorption whatever, indicating complete reaction with destruction of the β-lactam ring. A quantitative analysis of the two 7-aminocephalosporanic acid samples employing the ester absorption band at 1743 cm.$^{-1}$ as an internal standard showed no difference in β-lactam content of the two samples. Complete reaction of 6-aminopenicillanic acid with cysteine has occurred while under the same conditions there was no reaction of cysteine with 7-aminocephalosporanic acid.

EXAMPLE 2

The loss in antibiotic activity of a penicillin when reacted with cysteine was shown in the following manner. A solution of 388 mg. of the potassium salt of penicillin V and 1.2 g. of cysteine in 100 ml. of a phosphate buffer having a pH of 7.5 was prepared. A second solution was prepared in the same manner without the cysteine. Samples were removed from the solutions periodically and the biological activity of the solution was measured against B. subtilis using the following procedure.

Eight ml. of agar containing B. subtilis was placed on plastic plates approximately 90 mm. in diameter. The plates were allowed to cool to room temperature and 4 pads, each being 6 mm. in diameter, were placed on the agar plates. As the samples were withdrawn from the antibiotic solutions, they were diluted 1 to 1,000. Fifteen mcl. of these diluted samples were placed on the pads. Two pads in each plate contained control mixture while two pads contained the reaction mixture having cysteine present. The plates were stored overnight and read the following day with a Fisher-Lilly zone reader. The diameter of the zones in millimeters is an indication of the amount of active antibiotic present in the reaction mixtures at the time the sample was taken.

The results of this test are to be found in the following table.

| Time (min.) | Average zone diameter (mm.) | |
|---|---|---|
| | Cysteine | Control |
| 14 | 14.2 | 14.7 |
| 28 | | 15.2 |
| 50 | | 14.8 |
| 65 | | 14.8 |
| 122 | | 15.1 |
| 180 | | 14.9 |
| 251 | | 14.8 |

It is to be noted that after 28 minutes the penicillin sample containing cysteine was totally inactive while the sample with no cysteine showed full activity after 251 minutes. The cysteine has reacted with the penicillin, destroying its activity.

EXAMPLE 3

The activity of cephalothin and cephalothin treated with cysteine was determined as in Example 2. The test sample was prepared from 418 mg. of cephalothin and 1.2 g. of cysteine in 100 ml. of the phosphate buffer having a pH of 7.5. The control sample contained 418 mg. of cephalothin and 100 ml. of the buffer. The results are shown in the following table.

| Time (min.) | Average zone diameter (mm.) | |
|---|---|---|
| | Cysteine | Control |
| 2 | 18.4 | 18.8 |
| 20 | 18.1 | 19.1 |
| 34 | 19.3 | 18.8 |
| 45 | 18.4 | 18.8 |
| 60 | 17.9 | 18.4 |
| 88 | 18.0 | 18.0 |
| 118 | 18.1 | 18.1 |
| 150 | 17.9 | 17.8 |
| 178 | 17.5 | 17.4 |
| 208 | 18.8 | 18.3 |
| 248 | 17.6 | 17.9 |

Both the cysteine-treated sample and the control sample showed essentially constant activity against B. subtilis throughout the period of the test. It is apparent from these results that there was no reaction of the cephlothin with the cysteine.

EXAMPLE 4

Samples of benzylpenicillin were treated separately with 10 and 100 fold excesses of cysteine, 2-aminoethanethiol, and 2-dimethylaminoethanethiol at 25° C. in a phosphate buffer having a pH of 7.5. The course of the reaction was followed by biological assay. In all cases there was a complete disappearance of benzylpenicillin biological activity within four hours.

EXAMPLE 5

A series of penicillins and cephalosporins was treated with a ten fold excess of cysteine at a pH of 7.5 at room temperature. The results were followed using a microbiological assay. In the case of the penicillins no biological activity could be detected after one hour. On the other hand, biological activity remained unchanged after four hours with the cephalosporins. The structures of the penicillins and cephalosporins used are given below with reference to Formulas I and II.

| Penicillins | Cephalosporins | |
|---|---|---|
| Y' | Y | Z |
| $C_6H_5CH_2\overset{O}{\underset{\|}{C}}-$ | [thiophene]$-CH_2\overset{O}{\underset{\|}{C}}-$ | $-O\overset{O}{\underset{\|}{C}}CH_3$ |
| $C_6H_5OCH_2\overset{O}{\underset{\|}{C}}-$ | $C_6H_5\underset{NH_2}{\overset{\|}{CH}}\overset{O}{\underset{\|}{C}}-$ | $-O\overset{O}{\underset{\|}{C}}CH_3$ |
| [thiophene]$-CH_2\overset{O}{\underset{\|}{C}}-$ | $C_6H_5\underset{NH_2}{\overset{\|}{CH}}\overset{O}{\underset{\|}{C}}-$ | $-H$ |
| $C_6H_5\underset{NH_2}{\overset{\|}{CH}}\overset{O}{\underset{\|}{C}}-$ | [thiophene]$-CH_2\overset{O}{\underset{\|}{C}}-$ | $-H$ |
| [2,6-dimethoxyphenyl]$-\overset{O}{\underset{\|}{C}}-$ | $C_6H_5CH_2\overset{O}{\underset{\|}{C}}-$ | $-H$ |
| 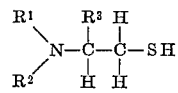 | $C_6H_5OCH_2\overset{O}{\underset{\|}{C}}-$ | $-H$ |

EXAMPLE 6

This example demonstrates the destruction of penicillin activity in the presence of cephalosporin activity. Cephlothin (1 g.) was placed in a flask and 10 mg. penicillin V and 400 mg. cysteine were added. Phosphate buffer (100 ml.) having a pH of 7.5 was then added to the flask. Samples were withdrawn periodically from the flask and assayed. The procedure used for detection of penicillin V was the standard diisopropyl ether extraction process, which can detect quantities of penicillin as low as 0.5 p.p.m. Within two hours the flask showed no penicillin V activity. The cephalosporin activity was unchanged at the end of this time.

It has been shown that penicillins are low molecular weight allergens in that they undergo irreversible reaction with tissue protein to form complete antigen, thus inducing allergies. It has been suggested that this reaction with protein occurs across the β-lactam ring. Cephalosporins that have been treated by my process are free of penicillins containing this β-lactam ring and therefore are free of this potential cause of allergic response.

I claim:
1. A method for selectively destroying penicillin biological activity in a mixture of a penicillin antibiotic and a cephalosporin antibiotic without substantially affecting the cephalosporin biological activity which comprises treating the mixture with a 2-mercaptoamine having the formula:

$$\underset{R^2}{\overset{R^1}{\diagdown}}N-\underset{\underset{H}{|}}{\overset{\overset{R^3}{|}}{C}}-\underset{\underset{H}{|}}{\overset{\overset{H}{|}}{C}}-SH$$

wherein $R^1$ and $R^2$ are selected from the class consisting of hydrogen and lower alkyl; $R^3$ is selected from the class consisting of hydrogen, $-CO_2H$, and $-CO_2R$; and R is lower alkyl, at a pH within the range of 4 to 9 and a temperature within the range of 20° to 40° C., the molar ratio of the 2-mercaptoamine to penicillin being at least 1.

2. A method as in claim 1 wherein the molar ratio of 2-mercaptoamine to penicillin is within the range of 10 to 100.

3. A method as in claim 1 wherein the 2-mercaptoamine is cysteine.

4. A method as in claim 3 wherein the molar ratio of cysteine to penicillin is within the range of 10 to 100.

5. A method as in claim 4 wherein the treatment is effected at a pH within the range of 6 to 8 and a temperature within the range of 25° to 35° C.

6. A method for removing penicillin impurities from a cephalosporin contaminated therewith which comprises treating the impure cephalosporin with a 2-mercaptoamine having the formula:

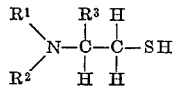

wherein $R^1$ and $R^2$ are selected from the class consisting of hydrogen and lower alkyl; $R^3$ is selected from the class consisting of hydrogen, $-CO_2H$, and $-CO_2R$; and R is lower alkyl, at a pH within the range of 4 to 9 and a temperature within the range of 20° to 40° C., the molar ratio of 2-mercaptoamine to penicillin impurity being at least 1.

7. A method as in claim 6 wherein the molar ratio of 2-mercaptoamine to penicillin impurity is within the range of 10 to 100.

8. A method as in claim 7 wherein the 2-mercaptoamine is cysteine.

9. A method as in claim 8 wherein the pH is within the range of 6 to 8 and the temperature is within the range of 25° to 35° C.

References Cited

UNITED STATES PATENTS 3,355,452  11/1967  Urech et al.

NICHOLAS S. RIZZO, Primary Examiner

U.S. Cl. X.R.

260—239.1